United States Patent
Bolding et al.

(10) Patent No.: US 11,238,366 B2
(45) Date of Patent: Feb. 1, 2022

(54) ADAPTIVE OBJECT MODELING AND DIFFERENTIAL DATA INGESTION FOR MACHINE LEARNING

(71) Applicant: International Business Machines Corporation, Armonk, NY (US)

(72) Inventors: Michael Josiah Bolding, Smyrna, GA (US); Matthew Elsner, Dunwoody, GA (US); Jian Lin, Alpharetta, GA (US); Matthew Paul Ouellette, Fredericton (CA); Yun Pan, Roswell, GA (US)

(73) Assignee: International Business Machines Corporation, Armonk, NY (US)

( * ) Notice: Subject to any disclaimer, the term of this patent is extended or adjusted under 35 U.S.C. 154(b) by 674 days.

(21) Appl. No.: 15/976,463

(22) Filed: May 10, 2018

(65) Prior Publication Data
US 2019/0347578 A1    Nov. 14, 2019

(51) Int. Cl.
*H04L 29/06* (2006.01)
*G06N 20/00* (2019.01)

(52) U.S. Cl.
CPC ......... *G06N 20/00* (2019.01); *H04L 63/1433* (2013.01)

(58) Field of Classification Search
CPC ............ H04L 63/1433; H04L 63/1425; H04L 63/1458; H04L 63/1416; G06N 20/00; G06N 3/02; G06N 5/00; G06N 7/02; G06N 7/00; G06N 7/05; G06N 99/00; G06K 9/66; G06K 9/99; G06F 16/337
See application file for complete search history.

(56) References Cited

U.S. PATENT DOCUMENTS

| | | | |
|---|---|---|---|
| 9,516,053 B1 * | 12/2016 | Muddu | H04L 63/1416 |
| 9,544,327 B1 * | 1/2017 | Sharma | G06N 20/00 |
| 9,836,598 B2 * | 12/2017 | Iyer | G06Q 10/105 |
| 10,917,419 B2 * | 2/2021 | Crotinger | G06F 11/3452 |
| 10,979,461 B1 * | 4/2021 | Cervantez | G06N 20/00 |
| 11,165,800 B2 * | 11/2021 | Thampy | G06N 20/00 |
| 2012/0150773 A1 | 6/2012 | Dicorpo et al. | |
| 2013/0198119 A1 | 8/2013 | Eberbardt et al. | |
| 2015/0127595 A1 * | 5/2015 | Hawkins, II | G06N 7/005 706/46 |

(Continued)

FOREIGN PATENT DOCUMENTS

WO    WO2017065070    4/2017

*Primary Examiner* — Trang T Doan
(74) *Attorney, Agent, or Firm* — Jeffrey S. LaBaw; David H. Judson

(57) ABSTRACT

A machine learning (ML)-based technique for user behavior analysis that detects when users deviate from expected behavior. A ML model is trained using training data derived from activity data from a first set of users. The model is refined in a computationally-efficient manner by identifying a second set of users that constitute a "watch list." At a given time, a differential data ingestion operation is then performed to incorporate data for the second set of users into the training data, while also pruning at least a portion of the data set corresponding to data associated with any user included in the first set but not in the second set. These operations update the training data used for the machine learning. The machine learning model is then refined based on the updated training data that incorporates the activity data ingested from the users identified in the watch list.

21 Claims, 5 Drawing Sheets

(56) References Cited

U.S. PATENT DOCUMENTS

| | | | |
|---|---|---|---|
| 2016/0078361 A1* | 3/2016 | Brueckner | H04L 67/10 |
| | | | 706/12 |
| 2016/0110528 A1 | 4/2016 | Gupta et al. | |
| 2017/0063886 A1* | 3/2017 | Muddu | H04L 43/00 |
| 2017/0223036 A1* | 8/2017 | Muddu | H04L 43/08 |
| 2017/0353477 A1* | 12/2017 | Faigon | H04L 63/1416 |
| 2019/0294538 A1* | 9/2019 | Zlatarev | G06N 3/04 |

* cited by examiner

ADAPTIVE OBJECT MODELING AND DIFFERENTIAL DATA INGESTION FOR MACHINE LEARNING

BACKGROUND

Technical Field

This disclosure relates generally to techniques to detect anomalous or malicious user behavior in an enterprise network.

Background of the Related Art

Enterprise security is a complex problem requiring the coordination across security policies, controls, threat models and threat detection scenarios (use cases). The implementation of these policies, models and controls requires extensive use of threat monitoring technologies and security devices, as well as human resources that have security, business and technical skills. In particular, the ever increasing number of threats at scale requires automation in support of security analysts, who are responsible for preventing, detecting and responding to these threats. In most cases, the analyst must manually search through a wide range of data sources (some private, many public), review past threat events and how they were handled, check for duplicate events, currently open similar events and a knowledge database, etc., to determine an appropriate response procedure to handle this information. This process of data collection, analysis, and determining the final disposition of the alert, is time consuming and tedious for an analyst.

There are a variety of tools that exist for threat monitoring to analyze a wide range of data sources to identify patterns that are indicative of threats, security policy and control anomalies. When these threats and/or anomalies are detected, actionable alerts are created. One such tool is IBM® QRadar® User Behavior Analytics (UBA), which analyzes user activity to detect insider threats. In particular, this tool helps security analysts detect anomalous or malicious behaviors that occur on the network, in part by training models for a subset of users using a machine learning (ML) application. Typically, UBA and ML are two applications that reside in separate containers in the security platform. The UBA application informs the ML application which set of users to monitor, and the ML application then ingests data from an associated event processor database as training data and uses that ingested data to train one or more ML models. While these systems provide significant advantages, data ingestion is a performance bottleneck for the platform, often incurring extended period of high CPU usage.

BRIEF SUMMARY

This disclosure describes a suite of techniques that improve the performance of a security platform that utilizes machine learning to train behavior analytics models that in turn are used to detect insider and other threats. The techniques provide for more computationally-efficient machine learning, e.g., in a user behavioral analytics system.

According to an aspect this disclosure, a machine learning model (or "analytic") is trained to identify suspicious behavior using a first training data set, where the first training data set is derived from user activity data ingested from a Security and Information Event (SIEM) or available data source. The first training data set is based on data associated with a first set of users. Periodically, the machine learning model is refined (updated) by the techniques of this disclosure, which provide for computational efficiencies especially during the model building process. To this end, the approach herein further involves identifying a second set of users that constitute a "watch list." Upon receipt of an update request, a differential data ingestion operation is then performed to incorporate data for the second set of users into the first training data set, while also pruning at least a portion of the data set corresponding to data associated with at least one user included in the first set but not the second set of users. These operations serve to update the training data set that is being used for the machine learning. The machine learning model is then refined based on the updated training data set that incorporates the activity data ingested from the users identified in the watch list.

Preferably, the second set of users is a subset of all users in the network and has a given size, and the users corresponding to those having a highest moving average risk score for the analytic are included in the second set of users. The second set of users that constitute the watch list may also include one or more users that have only recently become active in the system. According to the technique, after differential data ingestion and the pruning operations are carried out, the system carries on its machine learning, preferably using the second set of users.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION OF AN ILLUSTRATIVE EMBODIMENT

Figure 1:
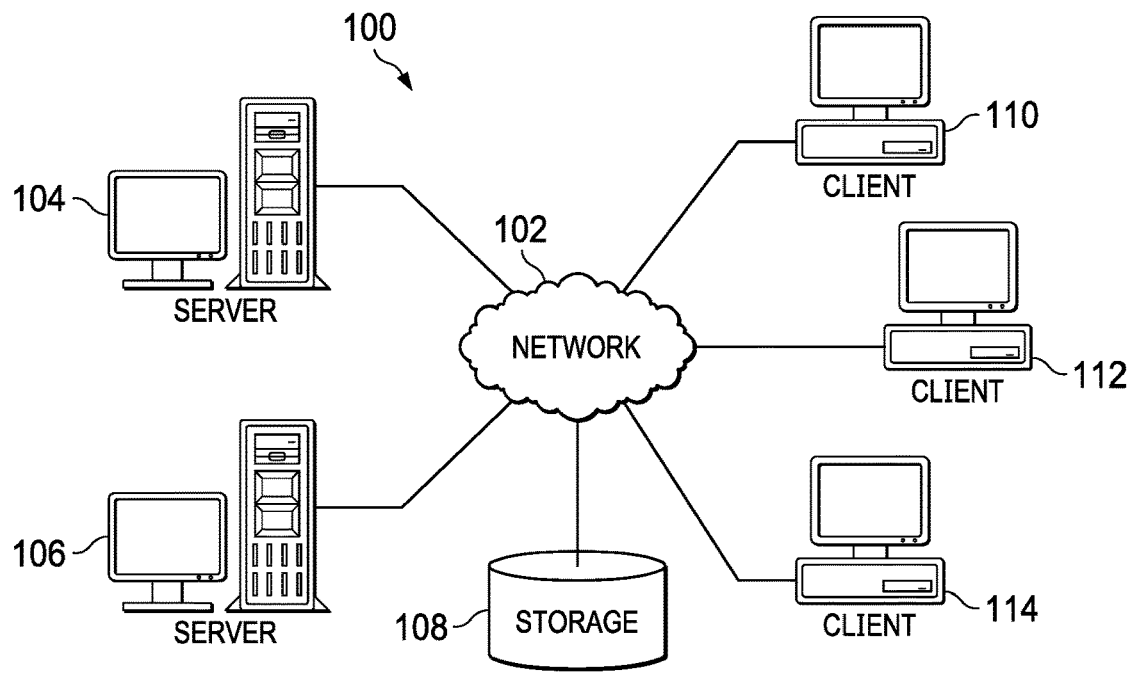
FIG. 1 depicts an exemplary block diagram of a distributed data processing environment in which exemplary aspects of the illustrative embodiments may be implemented.
Figure 2:
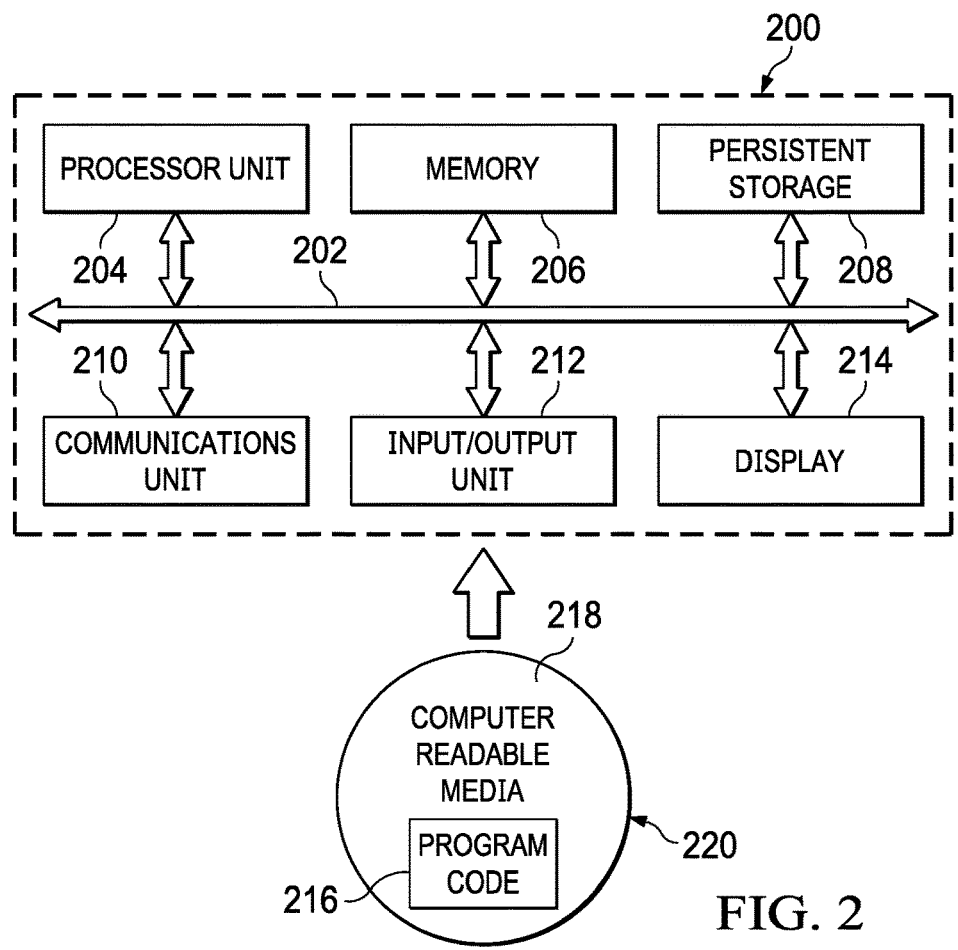
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Security Intelligence Platform with Incident Forensics

Figure 3:
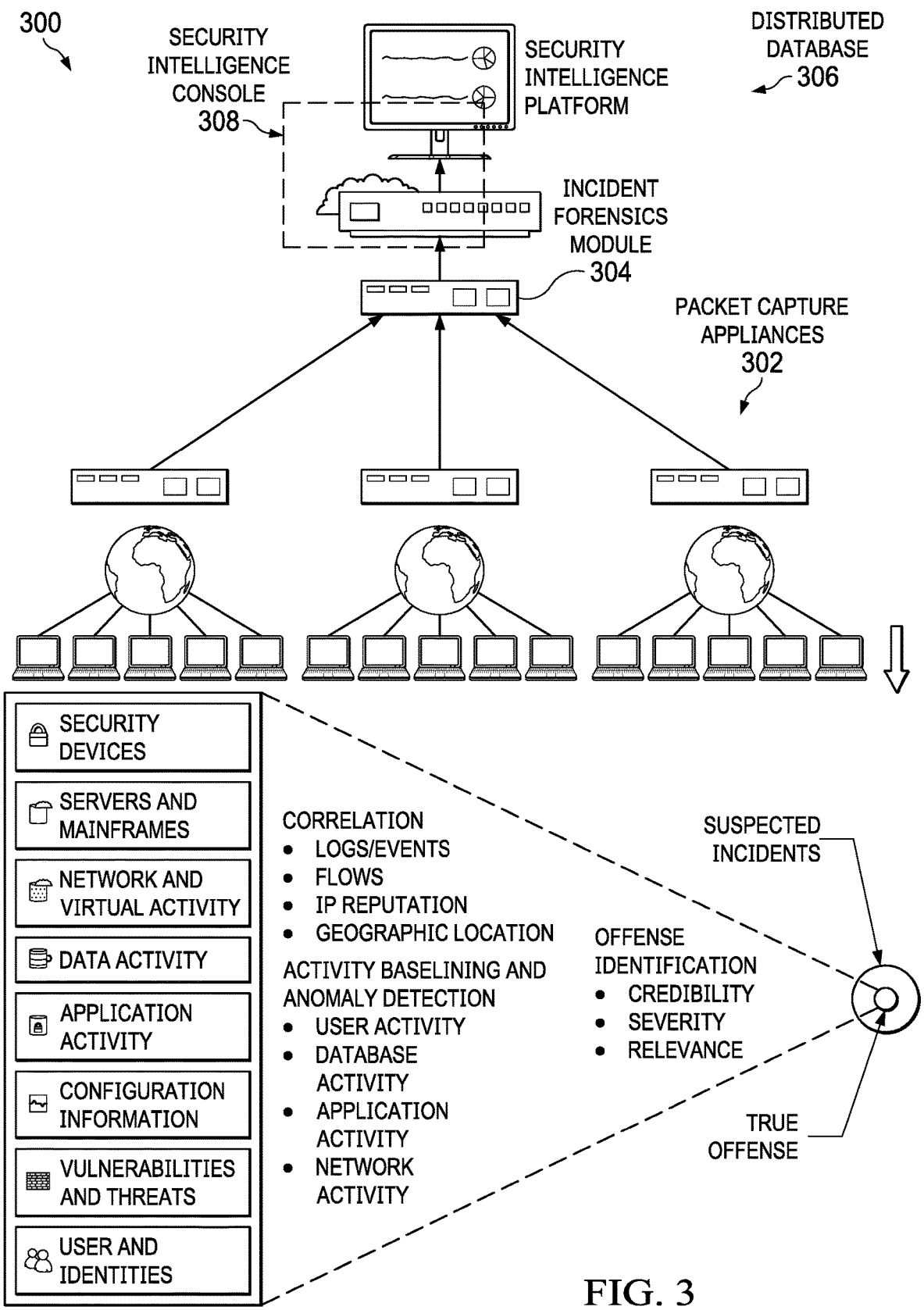
FIG. 3 illustrates a security intelligence platform in which the techniques of this disclosure may be practiced.

A known type of security intelligence platform is illustrated in FIG. 3. Generally, the platform provides search-driven data exploration, session reconstruction, and forensics intelligence to assist security incident investigations. In pertinent part, the platform 300 comprises a set of packet capture appliances 302, an incident forensics module appliance 304, a distributed database 306, and a security intelligence console 308. The packet capture and module appliances are configured as network appliances, or they may be configured as virtual appliances. The packet capture appliances 302 are operative to capture packets off the network (using known packet capture (pcap) application programming interfaces (APIs) or other known techniques), and to provide such data (e.g., real-time log event and network flow) to the distributed database 306, where the data is stored and available for analysis by the forensics module 304 and the security intelligence console 308. A packet capture appliance operates in a session-oriented manner, capturing all packets in a flow, and indexing metadata and payloads to enable fast search-driven data exploration. The database 306 provides a forensics repository, which distributed and heterogeneous data sets comprising the information collected by the packet capture appliances. The console 308 provides a web- or cloud-accessible user interface (UI) that exposes a "Forensics" dashboard tab to facilitate an incident investigation workflow by an investigator. Using the dashboard, an investigator selects a security incident. The incident forensics module 304 retrieves all the packets (including metadata, payloads, etc.) for a selected security incident and reconstructs the session for analysis.

A representative commercial product that implements an incident investigation workflow of this type is IBM® Security QRadar® Incident Forensics V7.2.3 (or higher). Using this platform, an investigator searches across the distributed and heterogeneous data sets stored in the database, and receives a unified search results list. The search results may be merged in a grid, and they can be visualized in a "digital impression" tool so that the user can explore relationships between identities.

In particular, a typical incident forensics investigation to extract relevant data from network traffic and documents in the forensic repository is now described. According to this approach, the platform enables a simple, high-level approach of searching and bookmarking many records at first, and then enables the investigator to focus on the bookmarked records to identify a final set of records. In a typical workflow, an investigator determines which material is relevant. He or she then uses that material to prove a hypothesis or "case" to develop new leads that can be followed up by using other methods in an existing case. Typically, the investigator focuses his or her investigation through course-grained actions at first, and then proceeds to fine-tune those findings into a relevant final result set. The bottom portion of FIG. 3 illustrates this basic workflow. Visualization and analysis tools in the platform may then be used to manually and automatically assess the results for relevance. The relevant records can be printed, exported, or submitted processing.

As noted above, the platform console provides a user interface to facilitate this workflow. Thus, for example, the platform provides a search results page as a default page on an interface display tab. Investigators use the search results to search for and access documents. The investigator can use other tools to further the investigation. One of these tools is a digital impression tool. A digital impression is a compiled set of associations and relationships that identify an identity trail. Digital impressions reconstruct network relationships to help reveal the identity of an attacking entity, how it communicates, and what it communicates with. Known entities or persons that are found in the network traffic and documents are automatically tagged. The forensics incident module 304 is operative to correlate tagged identifiers that interacted with each other to produce a digital impression. The collection relationships in a digital impression report represent a continuously-collected electronic presence that is associated with an attacker, or a network-related entity, or any digital impression metadata term. Using the tool, investigators can click any tagged digital impression identifier that is associated with a document. The resulting digital impression report is then listed in tabular format and is organized by identifier type.

Generalizing, a digital impression reconstructs network relationships to help the investigator identify an attacking entity and other entities that it communicates with. A security intelligence platform includes a forensics incident module that is operative to correlate tagged identifiers that interacted with each other to produce a digital impression. The collection relationships in a digital impression report represent a continuously-collected electronic presence that is associated with an attacker, or a network-related entity, or any digital impression metadata term. Using the tool, investigators can click any tagged digital impression identifier that is associated with a document. The resulting digital impression report is then listed in tabular format and is organized by identifier type.

Typically, an appliance for use in the above-described system is implemented is implemented as a network-connected, non-display device. For example, appliances built purposely for performing traditional middleware service oriented architecture (SOA) functions are prevalent across certain computer environments. SOA middleware appliances may simplify, help secure or accelerate XML and Web services deployments while extending an existing SOA infrastructure across an enterprise. The utilization of middleware-purposed hardware and a lightweight middleware stack can address the performance burden experienced by conventional software solutions. In addition, the appliance form-factor provides a secure, consumable packaging for implementing middleware SOA functions. One particular advantage that these types of devices provide is to offload processing from back-end systems. A network appliance of this type typically is a rack-mounted device. The device includes physical security that enables the appliance to serve as a secure vault for sensitive information. Typically, the appliance is manufactured, pre-loaded with software, and then deployed within or in association with an enterprise or other network operating environment; alternatively, the box may be positioned locally and then provisioned with standard or customized middleware virtual images that can be securely deployed and managed, e.g., within a private or an on premise cloud computing environment. The appliance may include hardware and firmware cryptographic support, possibly to encrypt data on hard disk. No users, including administrative users, can access any data on physical disk. In particular, preferably the operating system (e.g., Linux) locks down the root account and does not provide a command shell, and the user does not have file system access. Typically, the appliance does not include a display device, a CD or other optical drive, or any USB, Firewire or other ports to enable devices to be connected thereto. It is designed to be a sealed and secure environment with limited accessibility and then only be authenticated and authorized individuals.

An appliance of this type can facilitate Security Information Event Management (SIEM). For example, IBM® Security QRadar® SIEM is an enterprise solution that includes packet data capture appliances that may be configured as appliances of this type. Such a device is operative, for example, to capture real-time Layer 4 network flow data from which Layer 7 application payloads may then be analyzed, e.g., using deep packet inspection and other technologies. It provides situational awareness and compliance support using a combination of flow-based network knowledge, security event correlation, and asset-based vulnerability assessment. In a basic QRadar STEM installation, the system such as shown in FIG. 3 is configured to collect event and flow data, and generate reports. As noted, a user (e.g., an SOC analyst) can investigate offenses to determine the root cause of a network issue.

Generalizing, Security Information and Event Management (SIEM) tools provide a range of services for analyzing, managing, monitoring, and reporting on IT security events and vulnerabilities. Such services typically include collection of events regarding monitored accesses and unexpected occurrences across the data network, and analyzing them in a correlative context to determine their contribution to profiled higher-order security events. They may also include analysis of firewall configurations, network topology and connection visualization tools for viewing current and potential network traffic patterns, correlation of asset vulnerabilities with network configuration and traffic to identify active attack paths and high-risk assets, and support of policy compliance monitoring of network traffic, topology and vulnerability exposures. Some SIEM tools have the ability to build up a topology of managed network devices such as routers, firewalls, and switches based on a transformational analysis of device configurations processed through a common network information model. The result is a locational organization which can be used for simulations of security threats, operational analyses of firewall filters, and other applications. The primary device criteria, however, are entirely network- and network-configuration based. While there are a number of ways to launch a discovery capability for managed assets/systems, and while containment in the user interface is semi-automatically managed (that is, an approach through the user interface that allows for semi-automated, human-input-based placements with the topology, and its display and formatting, being datadriven based upon the discovery of both initial configurations and changes/deletions in the underlying network), nothing is provided in terms of placement analytics that produce fully-automated placement analyses and suggestions.

Figure 4:
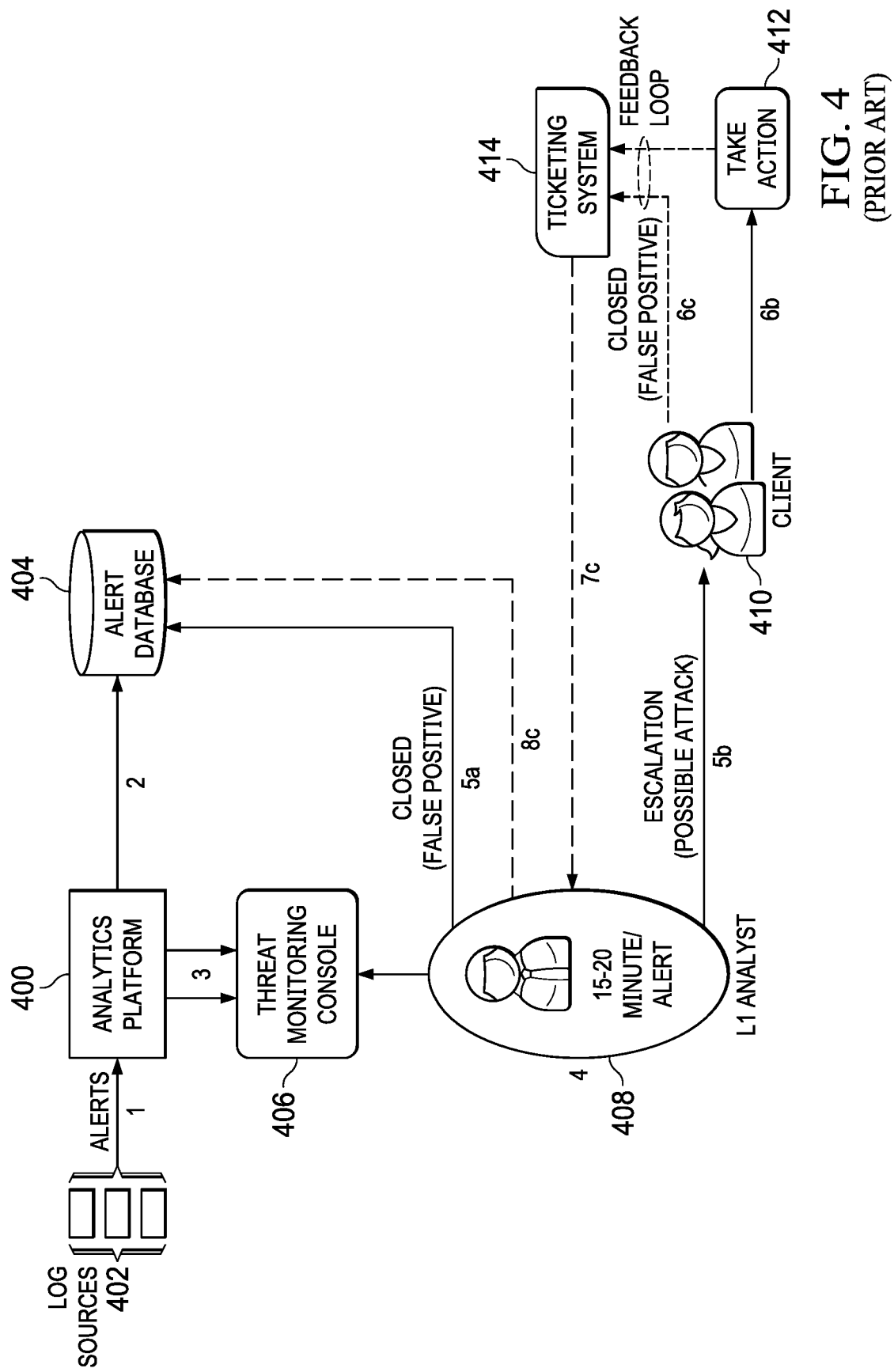
FIG. 4 depicts a Level 1 security threat monitoring operation in a data center operating environment according to known techniques.

FIG. 4 depicts a Security Operation Center (SOC) that provides Level 1 security threat monitoring using an analytics platform 400 such as IBM QRadar. The platform 400 receives alerts (at step (1)) from a variety of log sources 402, such as firewalls, intrusion detection and prevention systems, antivirus systems, web proxies, and other systems and network devices. At step (2), the alerts are stored in an alert database 404. At step (3), the alerts are provided to a threat monitoring console 406 that is manned by a security analyst 408. As is well-known, a SOC typically is manned by different levels of security analysts. A Level 1 (L1) analyst 408 is responsible for monitoring reported security events, and for closing or escalating those events according to SOC rules, policies and procedures. The security analyst 408 typically interacts with a client 410, which is the enterprise entity having an application that is being monitored for security threats. Although not shown, typically the SOC has one or more additional levels of security analysts, such Level 2 (L2) and Level 3 (L3) analysts. Typically, L2 security analysts handle escalations from L1 analysts and perform other administration and management functions, such as monitoring the performance of the L1 analysts to ensure that security events are handled timely, mentoring, and the like. Level 3 analysts handle further escalations (from L2 analysts), and provide additional higher-level administration and management functions in the SOC. Of course, the number of levels and the various tasks associated with each level may be varied and implementation-specific.

As depicted, the L1 analyst makes a finding regarding an alert, typically with a goal of making this finding within about 15-20 minutes after receiving the alert. Typically, the finding closes the alert (step 5(a)) as a false positive, or escalation the alert (step 5(b)) as a possible attack. The false positive finding is stored in the alert database 404. The attack finding typically is reported to the client 410 whose application is affected. Depending on the implementation (e.g., the SOC policy, the client procedure, etc.), some remediation or other action (step 6(b)) is taken; alternatively, the client 410 may indicate that indeed the alert is a false positive and thus should be closed (step 6(c)). The responsive action 412 may be carried out in an automated manner (e.g., programmatically), manually, or by a combination of automation and manual operations. The action may be carried out by SOC personnel, by the client, or by a combination of SOC personnel and the client. As also depicted, information regarding the response to the alert is also provided to a ticketing system 414, and such information may then be reported back to the security analyst (step 7(c)). The security analyst may then update the alert database (at step 8(c)) with the information about how the alert was handled (or otherwise closed). Thus, the alert and its associated handling information is stored in the alert database 404 and available as a data source going forward.

By way of additional background, the enterprise typically includes an identity management system by which the Company can define and manage organizational role and access entitlement to resources. Role assignment includes assigning a user to one or more business roles in the organization. Organizational roles are used to group people according to their function in the organization. Thus, for example, all Company employees are granted the employee role in the organization. Typically, a user may be assigned to one or more organizational roles in a company, such as, for example, site manager, project manager, HR manager, and the like, as well as ancillary employee roles such as university liaison or community coordinator. Assignment of a user to an organizational role enables role-based provisioning of access entitlements to managed resources. For example, services in an identity manager represent different types of managed resources, such as Oracle® databases, Windows® machines, and the like. An organizational role may be linked to services by means of provisioning policies, entitling persons in the organizational role to an account on the managed resource that is linked to that service.

The enterprise typically includes a directory service that hosts each directory in the organization. Each such directory typically stores information about a particular application and the user(s) or group(s) of users that have entitlements to use that application, or an application instance. A representative directory is accessible via the Lightweight Directory Access Protocol (LDAP), which is a directory service protocol that runs on top of the TCP/IP stack. LDAP provides a client-server based mechanism that can be used to connect to, search, and modify network-accessible directories. Using LDAP, a directory client can query the directory application and obtain user/group data.

Adaptive Object Monitoring and Differential Data Ingestion for Machine Learning

Figure 5:
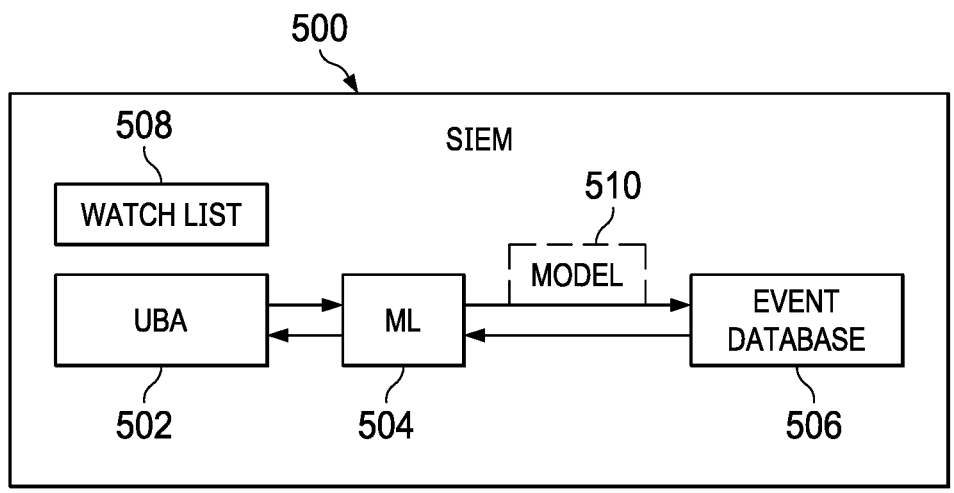
FIG. 5 depicts a Security Information Event Management (SIEM) platform that includes a User Behavior Analytics (UBA) application and a Machine Learning (ML) application and in which the adaptive object monitoring and data ingestion techniques of this disclosure may be implemented.

With the above as background, the following describes several techniques that are used to improve performance of a security platform that implements machine learning-based user behavior analysis. As is known, user behavior analysis typically leverages unsupervised machine learning to build classification models that are then used to detect user behavior anomalies. Preferably, behavioral anomalies are flagged, e.g., by issuing an alert in a user interface, although an analytics system that implements such techniques may also interact with (and drive) other mitigation and remediation processing (perhaps dependent on a security policy). In a typical implementation, and as depicted in FIG. 5, the performance enhancement techniques herein are implemented in association with a UBA application 502 and a Machine Learning (ML) application 504 that together execute in or in association with at SIEM 500. Each application may be implemented as a set of computer program instructions executed by one or more hardware processors, e.g., in a data processing system such as depicted in FIG. 2 and described above. While UBA 502 and ML 504 are depicted as separate applications, this is not a limitation, as these functions may be implemented in a single application, in which case they may be distinct processes, executing threads, program instances, or the like. As also depicted, typically STEM 500 hosts an event database 506. The event processor database 506 comprises a time series database for events and flows logged by the STEM and where data is stored on a periodic (e.g., minute-by-minute basis). In a typical operation, the training data is ingested by queries to the security platform (the SIEM) that serves as a host to both UBA 502 and ML 504 applications. To this end, ML application 504 queries the event database 506 and obtain the training data. The UBA (as well as the SEIM itself) also mechanisms (not shown) to update users risk scores, to issue alerts or other notifications, etc., and to interact with other network systems. A higher risk score typically is indicative of more anomalous or malicious behaviors.

As mentioned above, data ingestion is a performance bottleneck for the system. This disclosure describes several enhancements to the platform to address these issues. In particular, and according to a first aspect of this disclosure, an object Watch List (WL) 508 is built and utilized to control which of a set of data objects should be used to train a machine learning (ML) model 510 that is being built by the ML application 504. According to another aspect, this disclosure provides for an object WL update scheme that updates the data objects that will be used by the ML application 504, and preferably this scheme is based on a highest moving average score that also properly accounts for both old and new data objects. Further, another aspect of this disclosure provides a pair of techniques that, together, enhance performance by selectively managing the manner in which training data is ingested and used. As will be described, the data ingestion is "differential" to ensure that optimal data is used for the machine learning, and an associated training data reassembling technique ensures that the machine learning is not carried out on data that has already been seen and processed into the model.

The following describes an adaptive object monitoring scheme that uses a WL update. The object WL 508 is used to control which set of objects on which the model 510 will be trained. The algorithm used to construct and maintain this watch list also properly accounts for both old and new data objects. The following provides details of a preferred approach.

Preferably, the machine learning monitors a set of users, rather than all the users in the network, which although would be ideal is computationally-intensive. This is because both data ingestion and modeling building for the users are CPU- and RAM-intensive operations. Indeed, data ingestion scales linearly with the number of users, and model building (depending on the ML algorithm) can scale even steeper than cubically as the number of users increases. To this end, preferably the UBA 502 is configured to periodically compute the object watch list (WL) 508, typically with a relatively large period of time units (e.g., 7 days). Preferably, the WL has a fixed size. Once the watch list 508 is created or updated, as the case may be, the UBA application 502 notifies the ML algorithm (executing in ML application 504) that a WL (or updated WL) 508 is then ready to be used. The ML algorithm may have multiple analytics, and each analytic may have a different WL creation schedule or scheme, potentially with different size (i.e., the number of users in the list). Typically, the size of a particular WL 508 for an analytic is determined largely by the analytic's computational requirement. Thus, a computation-heavy analytic typically has a WL 508 of a smaller size relative to a computation-light analytic. Generalizing, analytic i is assigned $WL_i$.

Figure 6:
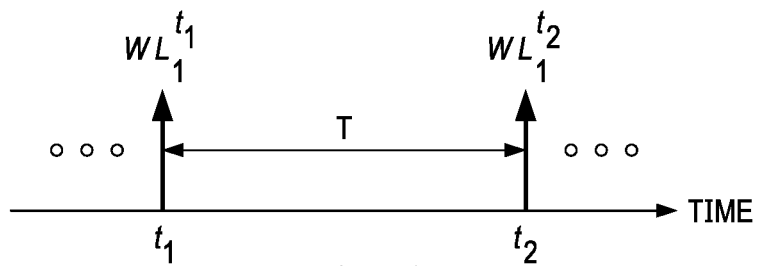
FIG. 6 depicts a watch list update timeline.

FIG. 6 depicts a watch list update timeline for a first analytic ("analytic 1"), which is updated by UBA in every T time units (measured as time $t_2-t_1$). Thus, and as depicted, analytic i has an associated watch list $WL_1^{t_1}$ at time $t_1$ and $WL_1^{t_2}$ at time $t_2$.

Each analytic preferably has a WL to use, and different algorithms may be used by the UBA application to construct different watch lists. According to an aspect of this disclosure, a WL is populated according to a ranking (of users) based on their (the users') moving average risk scores during a time window $T_{window}$. Thus, and for a WL of size S, the users corresponding to the top S moving average risk scores are then put into the WL by UBA. The time unit $T_{window}$ preferably is the same as the unit of time series that is being used by the analytic. Thus, if the analytic is using an hourly-based time series, a representative $T_{window}$ may be 720 hours; if the analytic is using a daily-based time series, a representative value may be 30 days. To ensure that the system does not miss a user who only recently joined the network, however, preferably the $T_{window}$ is assigned as a value $T_{fixed}$ for old users, and $T_{active}$ for new users. For old users, the time window preferably is a fixed period, e.g., 30 days, whereas for new users, the time window is the period measured from when the new user became active. Preferably, an old user becomes a new user if he or she has no activity for some period of time $T_{inactive}$. The time periods mentioned above are merely exemplary, and the time periods utilized may also be configurable and varied based one other factors such as set forth in an applicable security or other policy.

By applying these constraints (regarding which data objects to monitor and how a watch list is updated), the system automatically decides which users to put into the WL. While the above approach to adaptive object monitoring using a WL update is preferred, it is not intended to be limiting. Thus, for example, the system may afford a security administrator (or other authorized user) the option to manually add users into the WL according to some specific field knowledge or other criteria. The security administrator may also be afforded an option to configure the period for the WL update.

With the WLs in place, the following describes a differential data ingestion and training data reassembling scheme of this disclosure. As will be seen, preferably differential data ingestion is performed upon receiving a watch list update, while training data reassembling is performed immediately after differential data ingestion is completed; after differential data ingestion and training data reassembling are completed preferably the operation then switches to normal ingestion. Normal data ingestion is a default operation associated with a particular analytic; typically, normal ingest is a continuous process (e.g., operating every hour of every day depending on the analytic in question) whereby data for users in the current watch list only is ingested. When differential data ingestion according to this disclosure is carried out, this normal ingest for the analytic in effect is interrupted (and the nature of the ingestion modified) with resulting performance benefits, as will now be described in more detail.

Figure 7:
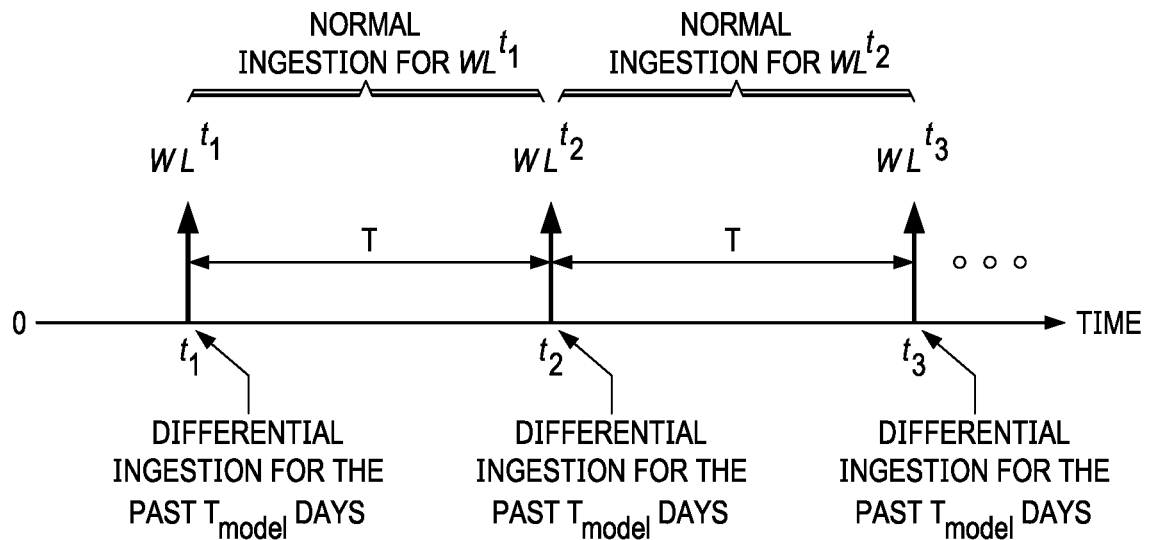
FIG. 7 depicts the watch list update timeline depicting the differential data ingestion scheme of this disclosure.

FIG. 7 depicts a timeline of a preferred ingestion switching operation of this disclosure. The system is assumed to be operating using normal ingestion subject to being switched to differential data ingestion. In particular, and at the time of WL update, such as $t_1$ and $t_2$ in FIG. 7, a differential ingestion is performed. As used herein, the notion of "differential ingestion" means that the system ingests data for users in the current watch list (for the analytic) but not in the previous watch list. For example, and referring to FIG. 7, at time $t_2$, the current watch list is $WL^{t_2}$ and the previous watch list is $WL^{t_1}$. If the set of the users in $WL^{t_2}$ is denoted as $S_2$ and the set of users in $WL^{t_1}$ is denoted as $S_1$, then the ingestion is performed for users in $S_2 \backslash S_1$ (in other words, the users in $S_2$ that are not in $S_1$). The ingestion time span is $T_{model}$, referring to the data in this time span that used as training data to start model computation. It should be noted that when the UBA application 502 first updates WL, the previous WL is denoted as an empty set. For example, if the time span of differential ingestion is for the past $T_{model}=30$ days, the above-described operation leads to 30 days of historical data for users in $S_2 \backslash S_1$, the difference of the set.

After differential ingestion is completed, and as also depicted in FIG. 7, the data ingestion operation switches back to normal ingestion (for the analytic). As noted above, normal ingest refers to the notion of ingesting data for users in the current watch list only (on whatever schedule for that ingestion that is being utilized by the analytic). Thus, typically normal ingestion is scheduled in every hour or every day depending on whether the analytic uses hourly-based time series or daily-based time series.

Figure 8:
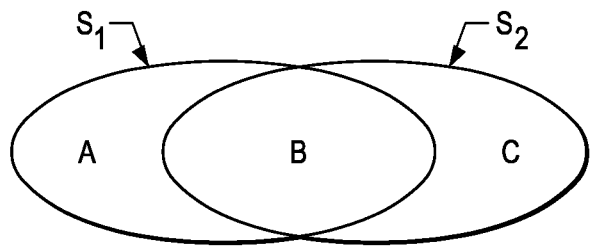
FIG. 8 depicts a training data reassembly scheme of this disclosure.

When differential data ingestion is used as has been described, certain additional "reassembling" of the ingested data is also utilized, as is now described. In particular, and at the moment of differential data ingestion, it will be appreciated that although the data for users in the previous WL is already ingested, some users in the previous WL may not still be in the current WL. Thus, a training data reassembly process is carried out to ensure that the training data is not duplicative. To this end, preferably training data reassembling according to this disclosure has two procedures. First, and with respect to the already ingested data for users in the previous WL, reassembly involves pruning users that are not in the current WL. Second, reassembly also includes appending the resulting data with the new users obtained from the above-described differential ingestion. The reassembly processing is depicted in FIG. 8. In particular, the first procedure prunes users in A in $S_1$ (those that are not in the current WL) leaving just those in B, whereas the second procedure appends users in C in $S_2$ (those that are new users) to the remaining B. As mentioned above, and after differential ingestion is completed, the system switches back to normal ingestion (ingesting data for users in the current watch list only).

Thus, preferably watch list processing occurs as follows. Assume there are several watch lists (e.g., $WL_1$, $WL_2$, $WL_3$ and $WL_4$) each separated by a given time period, e.g., seven (7) days. Adjacent watch lists thus may be designated $WL_t$ and $WL_{t+1}$. When it is time to build the model for $WL_{t+1}$, the data ingestion (a delta ingest) takes in data for users in $WL_{t+1}$ but not in $WL_t$. When delta ingestion completes, the normal ingestion (hourly or daily) is performed for all users in $WL_{t+1}$ until time reaches the point of $WL_{t+2}$. At this time, the delta ingestion ingests data for users in $WL_{t+2}$ but not in $WL_{t+1}$, and thereafter normal ingestion continues for users in $WL_{t+2}$, and so on. The process iterates forward in time in this manner, such that at time t+1 watch list $WL_{t+1}$ is the current watch list and $WL_t$ is the previous watch list. Similarly, at time t+2 watch list $WL_{t+2}$ is the current watch list and $WL_{t+1}$ is the previous watch list. Thus, the delta is between a current watch list and a previous watch list, and the normal ingest is for the current watch list. Preferably, and as noted above, a model is built for the current watch list, and this model is then used for a period of time (e.g., 7 days in this example) until the next watch list update, which kicks off a delta ingestion as described above.

Thus, FIGS. 7 and 8 depict how differential (delta) ingestion and pruning work together as time advances and different watch lists are processed into machine learning models. As depicted in FIG. 7, at time $t_1$ a model is built for WL_t1, at time $t_2$ a model is built for WL_t2, at time $t_3$ a model is built for WL_t3, and so forth, such that a model is built for the "current" watch list (e.g., every 7 days). The notion of "current" in thus a relative term and is dependent on where time is on the timeline. As explained above, a "current" WL will be preceded by a "previous" or "prior" WL. As FIG. 7 depicts, the delta ingestion occurs at two ends (↔) of each "T" arrow. Thus, assume $t_2$ is the "current" time and that delta ingestion is to be done to collect all data for the then-current WL to build a model. Because normal ingestion occurs (and has been occurring) for the previous watch list (located on the left side of the →), the ingestion misses data for the right side of the →. The delta is performed to fill this gap. Further, the reason data is pruned is because at time $t_2$ (in this example), the system only cares about data for WL_t2, and thus it is desirable to remove data collected for users in the previous watch list (WL_t1). In particular, at time $t_2$ the system already has all data collected for the users on WL_t1 all the way from $t_1$ to $t_2$ due to normal ingestion.

Figure 9:
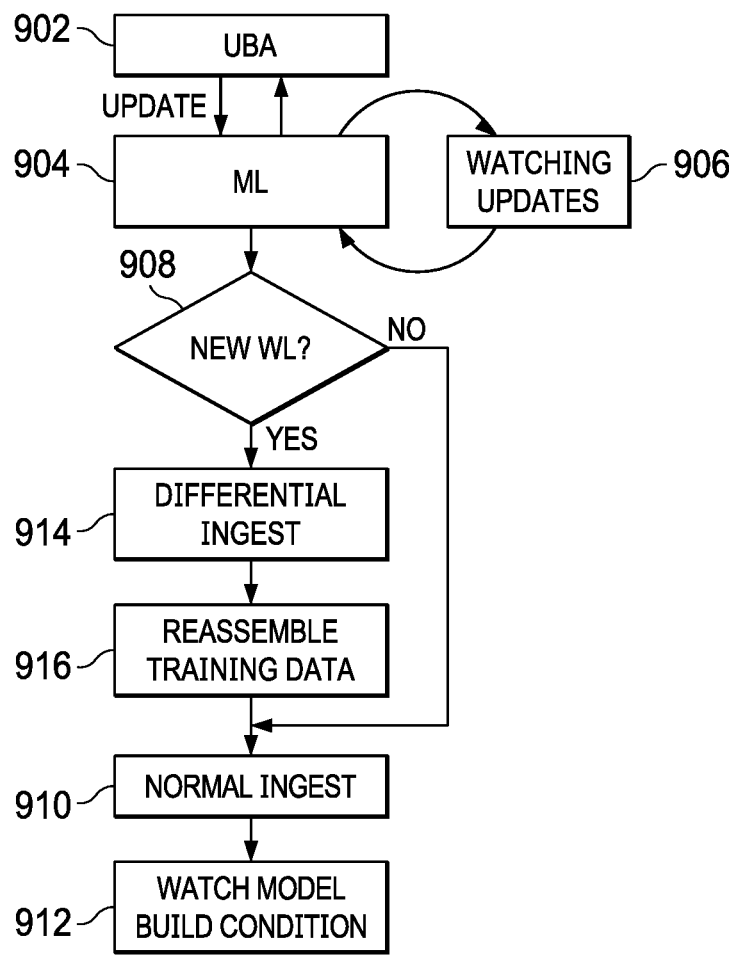
FIG. 9 depicts a process flow depicting the differential data ingestion and training data reassembling schemes and how they are implemented to facilitate machine learning according to this disclosure.

A complete process flow of the UBA-ML interaction, as well as the ingestion trigger and flow, is shown in FIG. 9. As described, when an update from UBA 902 is received, ML application 904 is configured to obtain the training data and update the ML model; to that end, interacts with a watching update operation 906 for the analytic. At step 908, ML application 904 performs a test to determine whether it is time for the ML application to obtain a new watch list. If the outcome this test is negative, the routine branches to step 910 and normal ingest continues (which is the default operation). If, however, outcome of this test is that a new WL should be obtained, the process continues at step 914 to execute the differential ingest. The process then continues at step 916 to reassemble the training data (as in the example in FIG. 8). Upon reassembly, the routine then continues with normal ingest at step 910. The overall data ingestion process terminates at step 912 upon triggering of a watch model build connection, which indicates that sufficient training data is now available to the ML application to facilitate building of the model. This completes the processing.

The techniques herein provide for more computationally-efficient machine learning in a UBA system of the type described. According a preferred implementation, a machine learning model is trained to identify suspicious behavior using a training data set, where the training data set is derived from data ingested from the SIEM (or some other available data source). The training data set is based on data associated with a first set of users. Periodically, the machine learning model is refined (updated) by the techniques of this disclosure, which as noted provide for computational efficiencies especially during the model building process. To this end, the approach herein further involves identifying a second set of users that constitute a "watch list." The second set of users that constitute the watch list for an analytic may have an overlap with the first set of users (e.g., a super set or subset of the first set), or the second set of users may be a different set than the first set. Upon receipt of an update request, a differential data ingestion operation is then performed to incorporate data for the second set of users into the training data set, while also pruning at least a portion of the data set corresponding to data associated with a user included in the first set but not the second set of users. The machine learning model is then refined based on the updated training dataset that incorporate data ingested from the watch list. Typically, the watch list has a given size, and there may be an upper limit, e.g., 10,000, on this size. As noted above, a computationally-heavier analytic typically has a smaller watch list, as the exact size of the watch list preferably is determined by the analytic and the available resources on the platform.

Preferably, users corresponding to those having a highest moving average risk score for the analytic are included in the second set of users. The second set of users that constitute the watch list may also include one or more users that have only recently become active in the system. According to the technique, after differential ingestion and the pruning operations are carried out, the system carries on its machine learning.

The above-described subject matter provides significant advantages. By implementing the techniques (namely, adaptive object monitoring, differential data ingestion and training data reassembly), CPU and memory usage in the computing system(s) on which the SIEM executes are significantly reduced, thereby enhancing performance of the overall process of building, updating and applying the ML model. As has been described, the approach advantageously combines an adaptive object monitoring with a WL updating algorithm with a differential data ingestion mechanism to thereby provide a prioritized list of suspicious users to monitor, and it significantly reduces the ingestion load on the security platform.

While the process has been described in a preferred operating context, this is not a limitation. The above-described schemes may be applied to other machine learning applications in which models are trained for a selected set of data objects. Moreover, there is no limitation on the analytic or ML technique that may leverage the above-described processing (in whole or in part). Further, and by reducing CPU requirements in the manner described, the schemes also have applicability in scenarios where machine learning is performed offline with more limited hardware resources.

The differential data ingestion and data reassembly techniques may be used with or without the particular adaptive object modeling scheme that accounts for both old and new objects. In particular, the differential data ingest and reassembly may be utilized with any watch list building technique associated with an analytic.

More generally, the technique herein provides for an enhanced user behavior analytics system that can detect insider threats, helping security analysts detect anomalous or malicious behaviors that occur on the network.

This subject matter may be implemented as-a-service. The subject matter may be implemented within or in association with a data center that provides cloud-based computing, data storage or related services. The machine learning (ML) functionality may be provided as a standalone function, or it may leverage functionality from other ML-based products and services.

In a typical use case, a SIEM or other security system has associated therewith a user interface that can be used to render the alert visually, to search and retrieve relevant information from alert database, and to perform other known input and output functions with respect thereto.

As noted above, the approach herein is designed to be implemented preferably in an automated manner within or in association with a security system, such as a SIEM. The above-identified commercial system is not intended to be limiting. Further, while the techniques are preferably implemented in a SIEM platform, they may also be provided as a standalone application, process, program, function or execution thread.

As has been described, the approach herein leverages data ingested from the SIEM, preferably from a data server that provides security event data. This data (for a user) may include a set of low-level data representing the user's interactions with one or more applications running in the enterprise computing environment. The nature and type of low-level categories will vary depending on implementation. As is known, a product such as IBM QRadar groups log sources into high-level categories, with each high-level categories comprising a set of low-level categories. Each event is assigned a specific high-level category and a low-level category within that high-level category. A representative high-level category may be "Application," which represents events that are related to application activity, and that high-level category typically includes a large number of low-level categories corresponding to log events that may occur with respect to a user's interaction with one or more applications that correspond to the Application type. In the case of an email application, for example, the low-level categories may include Mail Opened, Mail Closed, Mail Terminated, Mail Denied, Mailed Queued, and so forth. Each low-level category has as description and severity level that is captured in the log. The data server in the SIEM collects this data and can provide it (to the ML application) on request. A set of data for a particular user thus is a "data object."

Generalizing, the functionality described in this disclosure may be implemented in whole or in part as a standalone approach, e.g., a software-based function executed by a hardware processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. The techniques herein may be practiced in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the identity context-based access control functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the threat disposition and modeling techniques are implemented in a special purpose computer, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein provide for improvements to another technology or technical field, e.g., security incident and event management (SIEM) systems, other security systems, as well as improvements to automation-based cybersecurity analytics.

Having described the invention, what we claim is as follows:

1. A method of training and using a machine learning model to identify suspicious behavior in a network, the machine learning model using training data that is based on data associated with a first set of users, comprising:
    constructing a watch list comprising a second set of users as the machine learning model is being operating in an ingest mode against data being ingested for a first set of users;
    upon a given occurrence, interrupting the ingest mode and ingesting data associated with the second set of users;
    following data ingestion associated with the second set of users, pruning at least a portion of the ingested data to generate updated training data, the portion corresponding to data for any user included in the first set of users but not included in the second set of users;
    refining the machine learning model based at least in part on the updated training data; and
    switching back to the ingest mode and operating the refined machine learning model against data being ingested for the second set of users to enable identification and tracking of the suspicious behavior.

2. The method as described in claim 1 wherein, following ingesting and pruning, additional data associated with the second set of users is ingested.

3. The method as described in claim 1 wherein the second set of users includes users that have been found to have a highest moving average risk score for the machine learning model.

4. The method as described in claim 3 wherein the second set of users also includes one or more users that are newly-active in the network.

5. The method as described in claim 1 wherein the given occurrence is receipt of a request for an updated machine learning model.

6. The method as described in claim 1 wherein the first set of users includes all or a subset of the users in the network.

7. The method as described in claim 1 wherein the refined machine learning model is applied to enable identification and tracking of the suspicious behavior associated with one or more users in the first set of users that have been determined to satisfy a given risk condition.

8. An apparatus, comprising:
    a processor;
    computer memory holding computer program instructions executed by the processor to train and use a machine learning model to identify suspicious behavior in a network, the machine learning model using training data that is based on data associated with a first set of users, the computer program instructions comprising program code configured to:
    construct a watch list comprising a second set of users as the machine learning model is being operating in an ingest mode against data being ingested for a first set of users;
    upon a given occurrence, interrupt the ingest mode and ingest data associated with the second set of users;
    following data ingestion associated with the second set of users, prune at least a portion of the ingested data to generate updated training data, the portion corresponding to data for any user included in the first set of users but not included in the second set of users;
    refine the machine learning model based at least in part on the updated training data; and
    switch back to the ingest mode and operate the refined machine learning model against data being ingested for the second set of users to enable identification and tracking of the suspicious behavior.

9. The apparatus as described in claim 8 wherein the program code is further configured, following ingesting and pruning, to ingest additional data associated with the second set of users.

10. The apparatus as described in claim 8 wherein the second set of users includes users that have been found to have a highest moving average risk score for the machine learning model.

11. The apparatus as described in claim 10 wherein the second set of users also includes one or more users that are newly-active in the network.

12. The apparatus as described in claim 8 wherein the given occurrence is receipt of a request for an updated machine learning model.

13. The apparatus as described in claim 8 wherein the first set of users includes all or a subset of the users in the network.

14. The apparatus as described in claim 8 wherein the refined machine learning model is applied to enable identification and tracking of the suspicious behavior associated with one or more users in the first set of users that have been determined to satisfy a given risk condition.

15. A computer program product in a non-transitory computer readable medium for use in a data processing system to train and use a machine learning model to identify suspicious behavior in a network, the machine learning model using training data that is based on data associated with a first set of users, the computer program product holding computer program instructions that, when executed by the data processing system, are configured to:
- construct a watch list comprising a second set of users as the machine learning model is being operating in an ingest mode against data being ingested for a first set of users;
- upon a given occurrence, interrupt the ingest mode and ingest data associated with the second set of users;
- following data ingestion associated with the second set of users, prune at least a portion of the ingested data to generate updated training data, the portion corresponding to data for any user included in the first set of users but not included in the second set of users;
- refine the machine learning model based at least in part on the updated training data; and
- switch back to the ingest mode and operate the refined machine learning model against data being ingested for the second set of users to enable identification and tracking of the suspicious behavior.

16. The computer program product as described in claim 15 wherein the program code is further configured, following ingesting and pruning, to ingest additional data associated with the second set of users.

17. The computer program product as described in claim 15 wherein the second set of users includes users that have been found to have a highest moving average risk score for the machine learning model.

18. The computer program product as described in claim 17 wherein the second set of users also includes one or more users that are newly-active in the network.

19. The computer program product as described in claim 15 wherein the given occurrence is receipt of a request for an updated machine learning model.

20. The computer program product as described in claim 15 wherein the first set of users includes all or a given subset of the users in the network.

21. The computer program product as described in claim 15 wherein the refined machine learning model is applied to enable identification and tracking of the suspicious behavior associated with one or more users in the first set of users that have been determined to satisfy a given risk condition.

* * * * *